United States Patent [19]

Black

[11] 4,103,625
[45] Aug. 1, 1978

[54] SUPPORTING OR STABILIZING DEVICE

[76] Inventor: Robert B. Black, 5110 Berkley Ct., Fort Wayne, Ind. 46815

[21] Appl. No.: 770,682

[22] Filed: Feb. 22, 1977

Related U.S. Application Data

[63] Continuation of Ser. No. 606,535, Aug. 21, 1975, abandoned.

[51] Int. Cl.$^2$ .................... A61G 13/00; A47B 37/00
[52] U.S. Cl. ..................................... 108/44; 105/439; 269/328; 280/748; 296/19
[58] Field of Search ..................... 108/28, 29, 31, 44, 108/50, 161; 5/118; 16/115; 211/1.3; 248/298, 307, 206 A, 414, 161; 269/328; 244/118 P, 122 AG; 296/19, 20; 105/484, 439, 442, 486, 489, 499; 297/427; 312/239, 321; 280/748

[56] References Cited

U.S. PATENT DOCUMENTS

| | | | |
|---|---|---|---|
| 563,209 | 6/1896 | Phinney et al. | 105/442 |
| 1,112,517 | 10/1914 | Boisvert | 16/115 |
| 2,230,793 | 2/1941 | Borah | 211/1.3 X |
| 2,333,516 | 11/1943 | Brusilowsky | 108/29 X |
| 2,641,012 | 6/1953 | Storrs | 16/115 X |
| 3,209,729 | 10/1965 | Zedaker | 248/161 X |
| 3,527,352 | 9/1970 | De Lapa | 108/29 X |
| 3,616,622 | 11/1971 | Friedman | 211/DIG. 1 |

FOREIGN PATENT DOCUMENTS

| | | | |
|---|---|---|---|
| 1,430,275 | 1/1966 | France | 248/414 |
| 531,888 | 1/1941 | United Kingdom | 296/19 |
| 559,339 | 2/1944 | United Kingdom | 16/115 |

*Primary Examiner*—Roy D. Frazier
*Assistant Examiner*—William E. Lyddane
*Attorney, Agent, or Firm*—Albert L. Jeffers; Richard T. Seeger

[57] ABSTRACT

A supporting or stabilizing device, especially for a moving vehicle, in which at least one rod is provided mounted on a support frame, such as the underneath side of a counter top, with the rod being movable axially from an idle position wherein it is disposed substantially entirely within, or beneath, the support frame to an extended position wherein it extends outwardly frm the support frame. When the rod is extended outwardly from the support frame, it serves as a supporting or stabilizing member for an individual positioned in front of the support frame. The rod may be associated with a second like rod spaced from the first rod so that when both rods are extended, an individual can take a position between the rods and be supported or stabilized thereby. The rod, or rods, are slidable in support brackets and a retaining device is provided for retaining each rod in axially adjusted positions in the supporting brackets.

8 Claims, 6 Drawing Figures

U.S. Patent  Aug. 1, 1978  4,103,625

SUPPORTING OR STABILIZING DEVICE

RELATED APPLICATION

This application is a continuation of my coopending application Ser. No. 606,535, filed — Aug. 21, 1975, now abandoned entitled — Supporting or Stabilizing Device.

BACKGROUND OF THE INVENTION

1. Field of the Invention

The present invention relates to a stabilizing or supporting device, especially for use in a moving vehicle, and is particularly concerned with a device of this nature which can be retracted to a concealed position when not in use.

2. Description of the Prior Art

It is often the case that certain work functions must be performed in a moving vehicle. Such a vehicle can be an emergency vehicle, a recreational vehicle, a rail vehicle, a water vehicle or aircraft. In an emergency vehicle, it may be necessary to administer to a patient while the vehicle is in motion, and in the other types of vehicles or conveyances, cooking and other food preparation and domestic chores may be carried out while the vehicle is in motion.

Most of the work operations referred to above are carried out while the individual performing the work operation is positioned in front of a support frame which may be a counter top or stove or the like. With the vehicle in motion, it is often the case that unexpected motions of the vehicle will cause an individual positioned in front of such a support frame to be thrown off balance which would, of course, interfere with the work operation being carried out and could be hazardous, especially, if the work operation were to be that of administering to a patient or handling heated containers or the like.

With the foregoing in mind, a primary objective of the present invention is the provision of a supporting or stabilizing arrangement in which an individual performing a work operation of the nature referred to and positioned in front of a support frame is supported and stabilized so that erratic or unexpected motion, or even normal motion, of the vehicle does not interfere with the stability of the individual.

Another object of the invention is the provision of a relatively simple supporting or stabilizing device of the nature referred to which is relatively simple to install.

A still further object is the provision of a supporting or stabilizing device of the nature referred to which is inexpensive and which is adjustable to adapt the device to particular circumstances.

BRIEF SUMMARY OF THE INVENTION

According to the present invention, a support frame, which may, for example, be a counter top or any other sort of apparatus stationarily mounted, especially in a moving vehicle, is provided with one or more rods positioned substantially horizontally on the support frame and movable in the direction of the length thereof from a position of concealment within or beneath the support frame to an extended position thereon.

One or more of the rods can be provided, and when extended, provide a support or stabilizing member which can be engaged by an individual before the support frame, advantageously along the body region between the hip and knee, so that the individual's position is stabilized and support is provided by the rod or rods.

Bracket members are provided adapted for connection to the support frame and within which bracket members the respective rod is axially slidable. In a retracted position, the rod is substantially concealed within the frame, and in an extended position, projects outwardly a substantial distance from the frame.

Retaining means are provided for holding the rod in adjusted positions in the frame, and this retaining means may take the form of a frictional element frictionally engaging the rod or it may take the form of a magnet engaging the side of the rod and with the rod, in this latter case, being formed of magnetic material.

Advantageously, each rod and the brackets and retaining means therefor form a unit with each unit being individually installed on the support frame so that one or more of the rods can be employed with the spacing thereof selected in accordance with the particular circumstances.

In addition to employing a pair of the rods, with one being adapted to be positioned at each side of the individual using the device, it is also possible, by locating a single rod at the proper height, to provide a supporting or stabilizing member which can be straddled by the individual using the device.

The exact nature of the present invention will become more apparent upon reference to the following detailed specification taken in connection with the accompanying drawings in which:

DETAILED DESCRIPTION OF THE INVENTION

Figure 1:
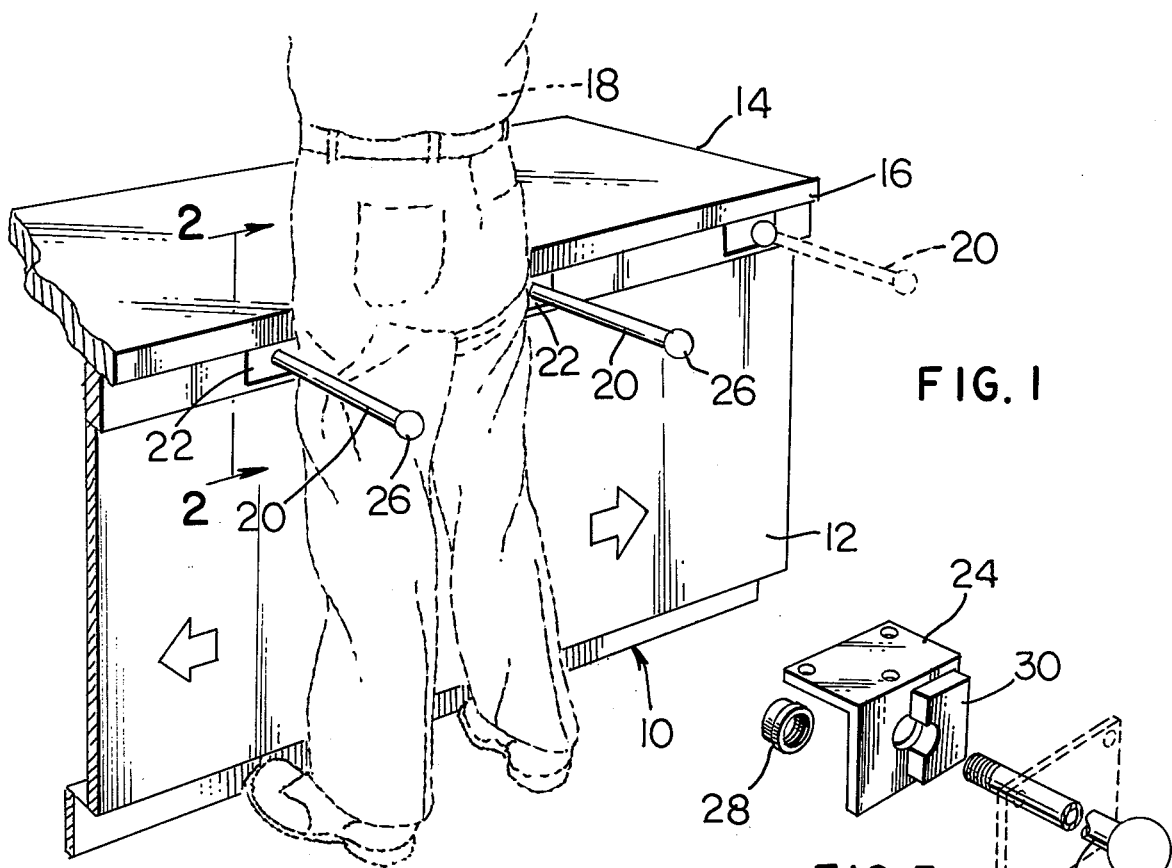
FIG. 1 is a perspective view showing a supporting and stabilizing device according to the present invention incorporated in a support frame which has a counter top.
Figure 3:
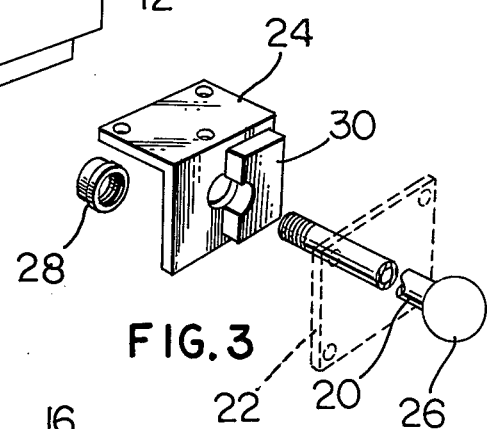
FIG. 3 is a perspective view showing the brackets which support a rod and showing the rod which is slidable therein and also showing one form which the retaining means for the rod can take.

Referring to the drawings somewhat more in detail, reference numeral 10 indicates a support frame which may be in the form of a counter having a base 12 and a counter top 14 with a forward edge 16 before which an individual 18 would position himself in order to perform work operations on the counter top.

As will be seen in FIG. 1, one or more rod elements 20 are provided extending outwardly from edge 16 of counter top 14 substantially at right angles thereto. In FIG. 1, two of the rod elements 20 are shown in full lines with one at each side of individual 18 so that the individual is supported and stabilized even though a vehicle in which the frame 10 is mounted moves in an unexpected manner or in a manner such as to destabilize individual 18. A third rod 20 is shown in dot-dash outline and indicates that a series of the rods could be provided if so desired.

Figure 2:
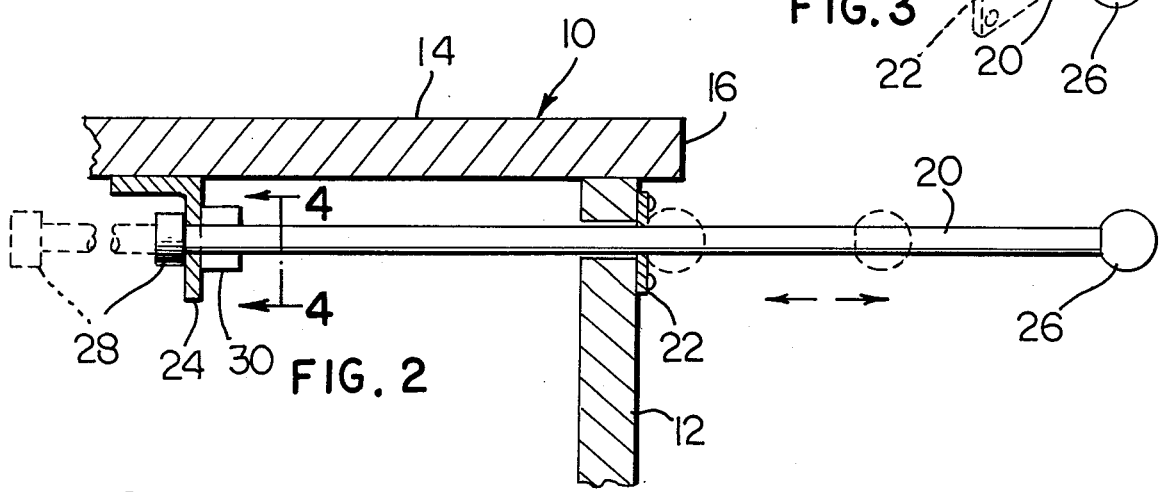
FIG. 2 is a vertical sectional view indicated by line II—II on FIG. 1.

The manner in which each rod is mounted in the frame will be seen in FIG. 2. In FIG. 2, the rod 20 is slidably supported in a forward bracket 22 and a rearward bracket 24. Forward bracket 22 may comprise an apertured plate secured to the front side of base 12 below counter top 14. Bracket 24, on the other hand, is advantageously secured to the underside of top 14 rearwardly from bracket 22.

The rod 20 may have a rounded knob 26 on the front end thereof and a cap 28 on the rearward end thereof. The assembly of the rod with the brackets is quite simple. The knob 26 may be fixed permanently to the rod and then, merely by removing cap 28, the rod can be introduced through the brackets from the front and then the cap 28 threaded on the rearward end of the rod.

It will be noted that cap 28 provides an abutment to engage bracket 24 and halt the rod in its extended full line position in FIG. 2. Knob 26, on the other hand, is availed of for pulling the rod outwardly and for pushing the rod back into retracted position and will serve as a stop when the rod is fully retracted by engagement with bracket 22.

It is desirable for the rod to be releasably retained in its retracted position and in any other position of axial adjustment, and for this purpose, there may be provided a magnet 30 mounted on the forwardly facing side of bracket 24 and engaging the side of rod 20.

Rod 20, in this case, is formed of magnetic material and will, thus, cooperate with magnet 30 so that, when the rod is moved to a position of axial adjustment, it will be retained in that position. The magnet 30 may be somewhat loosely connected to bracket 24 so that the magnet will always firmly engage the rod 20 in all positions of axial adjustment thereof.

Figure 4:
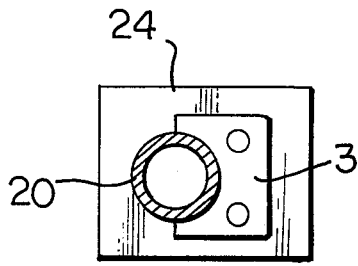
FIG. 4 is a sectional view indicated by line IV—IV on FIG. 2 showing more in detail a retaining element in the form of a magnet and the connection thereof to one of the support brackets for the rod.

The magnet 30 may be somewhat "C" shaped, as shown in FIG. 4, but may take other configurations, as may be desired.

Figure 5:
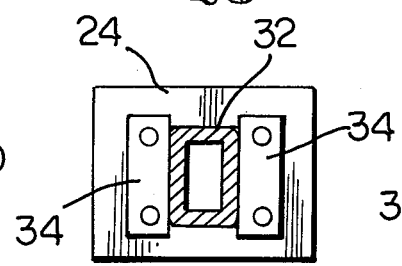
FIG. 5 is a view like FIG. 4 but shows a rectangular rod with a magnet disposed on each side thereof.

FIG. 5 shows a rod 32 which is rectangular in cross section and which is also formed of magnetic material and which has associated therewith magnets 34 disposed on opposite sides of the rod and, as in connection with magnet 30, also connected to bracket 24.

Figure 6:
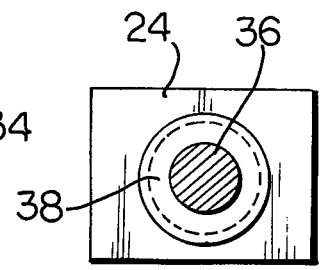
FIG. 6 is still another view like FIG. 4 but shows a retaining means in the form of friction material engaging the rod.

While it is preferred to form the rod of magnetic material and to employ magnets as the retaining means, it is also possible to make a rod of either magnetic or nonmagnetic material and to provide a friction device for holding the rod in axially adjusted positions. This is illustrated in FIG. 6 wherein the rod 36 is formed of magnetic or nonmagnetic material while a friction element 38 is provided which is mounted on bracket 24 and which frictionally engages the rod 36.

Friction element 38 could, for example, be a collar of rubber-like material or the like or could take other forms, such as a spring pressed friction block or the like. In any case, the rod is readily adjustable in the direction of the length thereof by pulling or pushing on the rod, and when the rod is released, it will be retained in its adjusted position, and including the retracted position of the rod. Still other releasable retaining means for holding the rod in axially adjusted position are, of course, possible.

It is contemplated that, in general, a pair of spaced rods, such as the two rods shown in full lines at 20 in FIG. 1, will be employed so that one can be positioned on each side of the individual to be stabilized. However, as mentioned, a single rod can be employed if it is positioned so that it can be received between the individual's legs and, furthermore, if the frame has an inside corner formed therein, a single rod could be spaced the proper distance from the corner and form a stabilizing device together with the angular portion of the frame.

The rods 20 shown in full lines in FIG. 1 are parallel and, in general, the rods will be parallel and when extended will extend from edge 16 at right angles thereto. However, it is also possible for the rods to be positioned at angles to each other, for example, so as to converge in the outwardly direction, thus, providing an even further stabilizing effect when in extended position.

Inasmuch as the rods and brackets form individual units, this last mentioned arrangement could readily be accomplished and would require, at most, no more than a special formation of the front bracket 22.

Modifications may be made within the scope of the appended claims.

What is claimed is:

1. In combination with a work table having a planar surface and a front edge and mounted within a vehicle, said vehicle having a floor located in front of said table, a support and stabilizing apparatus comprising: a horizontal elongate support element telescopically received in said table and extensible out of said table beyond said front edge in a direction generally parallel to said planar surface, said support element being spaced above the vehicle floor at a level which would be above the knees of a person standing in front of said table whereby the person can brace his body against said element, means for preventing movement of said element in a lateral direction with respect to the longitudinal axis thereof, and retaining means engaging said element for releasably retaining said element in its extended body bracing position.

2. The support and stabilizing apparatus of claim 1 wherein said retaining means comprises cooperating magnetic members on said element and stationary on said table operable for releasably holding said element in axially adjustable positions on said table.

3. A support and stabilizing apparatus according to claim 2 in which said magnetic member stationary on said table is a magnet and is so located as to engage a side of the element, said element being formed of magnetic material and forming the other of said magnetic members.

4. The support and stabilizing apparatus of claim 1 wherein said retaining means includes a friction member stationary on said table and frictionally engaging a side of said element.

5. The support and stabilizing apparatus of claim 1 including a second horizontal elongate support element telescopically received in said table and extensible out of said table beyond said front edge in a direction parallel to said first mentioned element and at the same horizontal level of said first element, said second element being spaced laterally from said first element a distance substantially as wide as a human body to receive and laterally support a human body between said elements, and retaining means on said table for releasably holding said second element in axially adjusted and lateral body supporting position on said table.

6. A support and stabilizing apparatus according to claim 5 including guide means comprising a pair of bracket members spaced in the axial direction of each said element and secured to said table, each of said retaining means comprising cooperating magnetic elements on each said support element and said table, each support element being formed of magnetic material and forming one of said magnetic elements pertaining thereto, the other magnetic element for each support element being mounted on one of the said bracket members pertaining to the respective support element, and abutment means on one end of each support element engageable with one of the bracket members for the respective support element to predetermine at least one limit position of the respective support element in the axial direction thereof.

7. A support and stabilizing apparatus according to claim 1 including guide means comprising a pair of axially spaced bracket members secured to the table and through which said element extends for axial sliding movement relative to the table, the said retaining means being mounted on one of said bracket members, and abutment means on at least one end of said support element to engage a said bracket member and predetermine a limit position of the support element in the axial direction thereof.

8. A support and stabilizing apparatus according to claim 1 in which said retaining means releasably retains said element in a plurality of longitudinally extending positions.

* * * * *